(12) United States Patent
Liu

(10) Patent No.: US 11,924,758 B2
(45) Date of Patent: Mar. 5, 2024

(54) WAKE-UP METHOD, WAKE-UP APPARATUS, ELECTRONIC DEVICE, AND COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 24 days.

(21) Appl. No.: 17/267,269

(22) PCT Filed: Aug. 13, 2018

(86) PCT No.: PCT/CN2018/100302
§ 371 (c)(1),
(2) Date: Feb. 9, 2021

(87) PCT Pub. No.: WO2020/034073
PCT Pub. Date: Feb. 20, 2020

(65) Prior Publication Data
US 2021/0314865 A1  Oct. 7, 2021

(51) Int. Cl.
*H04W 52/02* (2009.01)
*H04L 5/00* (2006.01)
*H04W 72/044* (2023.01)
*H04W 72/23* (2023.01)
(Continued)

(52) U.S. Cl.
CPC ....... *H04W 52/0229* (2013.01); *H04L 5/0051* (2013.01); *H04W 52/0219* (2013.01); *H04W 52/0235* (2013.01); *H04W 72/046* (2013.01); *H04W 72/23* (2023.01); *H04W 76/27* (2018.02); *H04W 76/28* (2018.02)

(58) Field of Classification Search
None
See application file for complete search history.

(56) References Cited

U.S. PATENT DOCUMENTS

| 9,872,252 | B1 | 1/2018 | Ang et al. |
| 11,310,001 | B2 * | 4/2022 | Beale .................. H04L 5/0064 |
| 2005/0063331 | A1 | 3/2005 | Kim et al. |

(Continued)

FOREIGN PATENT DOCUMENTS

| CN | 105430758 A | 3/2016 |
| CN | 107431982 A | 12/2017 |

(Continued)

OTHER PUBLICATIONS

European Patent Office, Extended European Search Report Issued in Application No. 18930013.0, dated Jul. 30, 2021, 10 pages.
ISA State Intellectual Property Office of the People's Republic of China, Written Opinion of the International Searching Authority Issued in Application No. PCT/CN2018/100302, dated Apr. 26, 2019, WIPO, 9 pages.
InterDigital, Inc, "Remaining issues on beam management", 3GPP TSG RAN WG1 Meeting #91, R1-1720630, Reno, USA, Nov. 27-Dec. 1, 2017, 13 pages.

(Continued)

*Primary Examiner* — Jutai Kao
(74) *Attorney, Agent, or Firm* — Finnegan, Henderson, Farabow, Garrett & Dunner, L.L.P.

(57) ABSTRACT

An example of the present disclosure provides a wakeup method, including: determining user equipment (UE) to be waked up; sending a wakeup signal block to the UE, wherein the wakeup signal block includes a wakeup signal and a physical channel, the physical channel is used to transmit assistance information and the assistance information is used to assist the UE in receiving or sending a signal.

11 Claims, 7 Drawing Sheets

(51) Int. Cl.
*H04W 76/27* (2018.01)
*H04W 76/28* (2018.01)

(56) References Cited

U.S. PATENT DOCUMENTS

| | | | | |
|---|---|---|---|---|
| 2014/0022909 | A1* | 1/2014 | Mahmoud | H04L 1/0026 |
| | | | | 370/241 |
| 2014/0112225 | A1 | 4/2014 | Jafarian et al. | |
| 2016/0323823 | A1 | 11/2016 | Ryoo et al. | |
| 2018/0018185 | A1* | 1/2018 | Sun | G06F 21/44 |
| 2018/0020405 | A1 | 1/2018 | Huang et al. | |
| 2019/0059056 | A1* | 2/2019 | Islam | H04L 5/001 |
| 2019/0254110 | A1* | 8/2019 | He | H04L 41/0896 |
| 2020/0214078 | A1* | 7/2020 | Jiang | H04W 52/0216 |
| 2020/0221416 | A1* | 7/2020 | Wong | H04W 56/001 |
| 2021/0022202 | A1* | 1/2021 | Kim | H04W 76/27 |
| 2021/0084615 | A1* | 3/2021 | Priyanto | H04W 68/06 |
| 2021/0153162 | A1* | 5/2021 | Chen | H04W 68/02 |
| 2021/0195521 | A1* | 6/2021 | Müller | H04W 52/0219 |
| 2021/0266135 | A1* | 8/2021 | Fu | H04L 5/0098 |
| 2021/0274439 | A1* | 9/2021 | Cui | H04W 76/28 |
| 2021/0321464 | A1* | 10/2021 | Lin | H04W 56/0075 |
| 2022/0295403 | A1* | 9/2022 | Shrestha | H04W 68/00 |

FOREIGN PATENT DOCUMENTS

| | | |
|---|---|---|
| CN | 107592981 A | 1/2018 |
| CN | 107800526 A | 3/2018 |
| CN | 107820721 A | 3/2018 |
| CN | 108024319 A | 5/2018 |
| CN | 108702707 A | 10/2018 |
| CN | 110536381 A | 12/2019 |
| CN | 110831124 A | 2/2020 |
| WO | WO 2014/179921 A1 | 11/2014 |
| WO | WO 2016/044190 A1 | 3/2016 |
| WO | WO 2018/128595 A1 | 7/2018 |

OTHER PUBLICATIONS

State Intellectual Property Office of the People's Republic of China, Second Office Action and Search Report Issued in Application No. 201880001754.5, dated Dec. 24, 2020, 8 pages.

State Intellectual Property Office of the People's Republic of China, Office Action and Search Report Issued in Application No. 2018800017545, dated Apr. 22, 2020, 15 pages.

ISA State Intellectual Property Office of the People's Republic of China, International Search Report Issued in Application No. PCT/CN2018/100302, dated Apr. 26, 2019, WIPO, 4 pages.

CATT, CMCC, vivo, CATR, Qualcomm, "New SID: Study on UE Power Saving and Wakeup Mechanism in NR", 3GPP TSG RAN Meeting #78, Lisbon, Portugal, RP-172372, dated Dec. 18-21, 2017, 5 pages.

CATT, "UE Power Saving and Wakeup Mechanism", 3GPP TSG RAN Meeting #78, Lisbon, Portugo, RP-172373, Dec. 18-21, 2017, 14 pages.

CATT, CMCC, vivo, CATR, Qualcomm, "New SID: Study on UE Power Saving and Wakeup Mechanism in NR", 3GPP TSG RAN Meeting #78, Lisbon, Portugal, RP-172718 (rev of RP-172372), Dec. 18-21, 2017, 5 pages.

CATT, Views on the Scope of the Study of UE Power Saving and Wakeup Mechanism, 3GPP TSG-RAN #79, Chennai, India, RP-180228, Mar. 19-22, 2018, 2 pages.

State Intellectual Property Office of the People's Republic of China, Office Action and Search Report issued in Application No. 202111101116.0, dated Mar. 23, 2023, 20 pages.

Indian Patent Office, Hearing Notice issued in Application No. 202147009726, Apr. 22, 2023, 2 pages.

* cited by examiner

WAKE-UP METHOD, WAKE-UP APPARATUS, ELECTRONIC DEVICE, AND COMPUTER-READABLE STORAGE MEDIUM

CROSS REFERENCE TO RELATED APPLICATIONS

This application is a national phase application based on International Application No. PCT/CN2018/100302, filed Aug. 13, 2018, the content of which is incorporated herein by reference.

TECHNICAL FIELD

The present disclosure relates to the field of communication technology, and in particular to wakeup methods, wakeup apparatuses, electronic devices and computer readable storage media.

BACKGROUND

In order to reduce power consumption of user equipment (UE), wakeup signal (WUS for short) is introduced in the related art. A base station may help to reduce the power consumption of the UE in a connected state or an idle state to some extent by sending wakeup signals to the UE.

However, current wakeup signals carry less information, resulting in difficulty in satisfying service requirements.

SUMMARY

In view of this, an example of the present disclosure provides a wakeup method, a wakeup apparatus, an electronic device and a computer readable storage medium.

According to a first aspect of the example of the present disclosure, there is provided a wakeup method applied to a base station, including:
  determining user equipment (UE) to be waked up;
  sending a wakeup signal block to the UE, where the wakeup signal block includes a wakeup signal and a physical channel, the physical channel is used to transmit assistance information, and the assistance information is used to assist the UE in receiving or sending a signal.

Optionally, if the UE is in a connected state, the assistance information includes assistance demodulation information, where the assistance demodulation information is used to demodulate information transmitted over a physical downlink control channel.

Optionally, the assistance information includes assistance indication information, where the assistance indication information is used to indicate beams corresponding to signal receiving and signal sending of the UE respectively.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Optionally, the assistance information includes assistance grouping information, where the UE uses the assistance grouping information to determine whether a UE group to which the UE belongs corresponds to a UE group indicated by the assistance grouping information.

Optionally, the wakeup signal includes assistance grouping information, where the UE uses the assistance grouping information to determine whether a UE group to which the UE belongs corresponds to a UE group indicated by the assistance grouping information.

Optionally, the wakeup signal is an orthogonal pseudorandom sequence.

Optionally, the wakeup signal and the physical channel are frequency-division-multiplexed.

Optionally, the wakeup signal and the physical channel are time-division-multiplexed.

Optionally, the method further includes:
  before sending the wakeup signal block to the UE, scrambling information transmitted over the physical channel by the wakeup signal, where wakeup signals corresponding to different cells are mutually orthogonal.

According to a second aspect of the example of the present disclosure, there is provided a wakeup method applied to user equipment (UE), including:
  receiving a wakeup signal block sent from a base station, where the wakeup signal block includes a wakeup signal and a physical channel; and
  receiving or sending a signal according to assistance information transmitted over the physical channel.

Optionally, if the UE is in a connected state, the assistance information includes assistance demodulation information, where receiving or sending the signal according to the assistance information transmitted over the physical channel includes:
  performing demodulation for information transmitted over a physical downlink control channel according to the assistance demodulation information.

Optionally, the assistance information includes assistance indication information, where receiving or sending the signal according to the assistance information transmitted over the physical channel includes:
  determining beams corresponding to receiving and sending a signal respectively according to the assistance indication information.

Optionally, if the UE is in a connected state, the assistance indication information includes index information of a synchronization signal block and/or channel state information reference signal.

Optionally, if the UE is in an idle state, the assistance indication information includes index information of a synchronization signal block.

Optionally, the assistance information includes assistance grouping information, where receiving or sending the signal according to the assistance information transmitted over the physical channel includes:
  determining a UE group to which the UE belongs according to the assistance grouping information.

Optionally, the wakeup signal includes assistance grouping information, where the UE uses the assistance grouping information to determine whether the UE group to which the UE belongs corresponds to a UE group indicated by the assistance grouping information.

Optionally, the wakeup signal is an orthogonal pseudorandom sequence.

Optionally, the wakeup signal and the physical channel are frequency-division-multiplexed.

Optionally, the wakeup signal and the physical channel are time-division-multiplexed.

Optionally, the method further includes:
  before receiving or sending the signal according to the assistance information transmitted over the physical channel, descrambling information transmitted over the physical channel according to the wakeup signal, where wakeup signals corresponding to different cells are mutually orthogonal.

Optionally, the method further includes:

determining whether a downlink signal is synchronized according to the wakeup signal.

According to a third aspect of the example of the present disclosure, there is provided a wakeup apparatus applied to a base station, including:

a wakeup determining module, configured to determine user equipment (UE) to be waked up;

a wakeup sending module, configured to send a wakeup signal block to the UE, where the wakeup signal block includes a wakeup signal and a physical channel, the physical channel is used to transmit assistance information and the assistance information is used to assist the UE in receiving or sending a signal.

Optionally, if the UE is in a connected state, the assistance information includes assistance demodulation information, where the assistance demodulation information is used to demodulate information transmitted over a physical downlink control channel.

Optionally, the assistance information includes assistance indication information, where the assistance indication information is used to indicate beams corresponding to signal receiving and signal sending of the UE respectively.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Optionally, the assistance information includes assistance grouping information, where the UE uses the assistance grouping information to determine whether a UE group to which the UE belongs corresponds to a UE group indicated by the assistance grouping information.

Optionally, the wakeup signal includes assistance grouping information, where the UE uses the assistance grouping information to determine whether a UE group to which the UE belongs corresponds to a UE group indicated by the assistance grouping information.

Optionally, the wakeup signal is an orthogonal pseudo-random sequence.

Optionally, the wakeup signal and the physical channel are frequency-division-multiplexed.

Optionally, the wakeup signal and the physical channel are time-division-multiplexed.

Optionally, the apparatus further includes:

an information scrambling module, configured to scramble information transmitted over the physical channel by the wakeup signal, where wakeup signals corresponding to different cells are mutually orthogonal.

According to a fourth aspect of the example of the present disclosure, there is provided a wakeup apparatus applied to user equipment (UE), including:

a wakeup receiving module, configured to receive a wakeup signal block sent from a base station, where the wakeup signal block includes a wakeup signal and a physical channel;

a signal assisting module, configured to receive or send a signal according to the assistance information transmitted over the physical channel.

Optionally, if the UE is in a connected state, the signal assisting module is configured to demodulate information transmitted over a physical downlink control channel according to the assistance demodulation information.

Optionally, the assistance information includes assistance indication information, and the signal assisting module is configured to determine beams corresponding to receiving and sending the signal respectively according to the assistance indication information.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Optionally, the assistance information includes assistance grouping information, and the signal assisting module is configured to determine a UE group to which the UE belongs according to the assistance grouping information.

Optionally, the wakeup signal includes assistance grouping information, where the UE uses the assistance grouping information to determine whether a UE group to which the UE belongs corresponds to a UE group indicated by the assistance grouping information.

Optionally, the wakeup signal is an orthogonal pseudo-random sequence.

Optionally, the wakeup signal and the physical channel are frequency-division-multiplexed.

Optionally, the wakeup signal and the physical channel are time-division-multiplexed.

Optionally, the apparatus further includes:

an information descrambling module, configured to descramble information transmitted over the physical channel by the wakeup signal, where wakeup signals corresponding to different cells are mutually orthogonal.

Optionally, the apparatus further includes:

a synchronization determining module, configured to determine whether a downlink signal is synchronized according to the wakeup signal.

According to a fifth aspect of the present disclosure, there is provided an electronic device, including:

a processor;

a memory storing instructions executable by the processor.

The processor is configured to perform steps in the method according to any one above example.

According to a sixth aspect of the present disclosure, there is provided a computer readable storage medium storing computer programs which are executed by the processor to perform steps in the method according to any one above example.

In the examples of the present disclosure, the wakeup signal block includes the physical channel as well as the wakeup signal. Assistance information may be transmitted over the physical channel. The assistance information may be used to assist the UE in receiving or sending a signal. In this way, the wakeup signal block can carry the wakeup signal to wake up the UE and at the same time carry assistance information over the physical channel, so that more information can be sent to the UE when a wakeup signal is sent to the UE. Thus, more service requirements can be satisfied.

BRIEF DESCRIPTION OF THE DRAWINGS

To describe the technical solutions in the examples of the present disclosure more clearly, drawings required in descriptions of the examples of the present disclosure will be briefly introduced below. It is apparent that the drawings described below are merely examples of the present disclosure and other drawings may be obtained by those of ordinary skill in the prior art based on these drawings without paying creative work.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Figure 1:
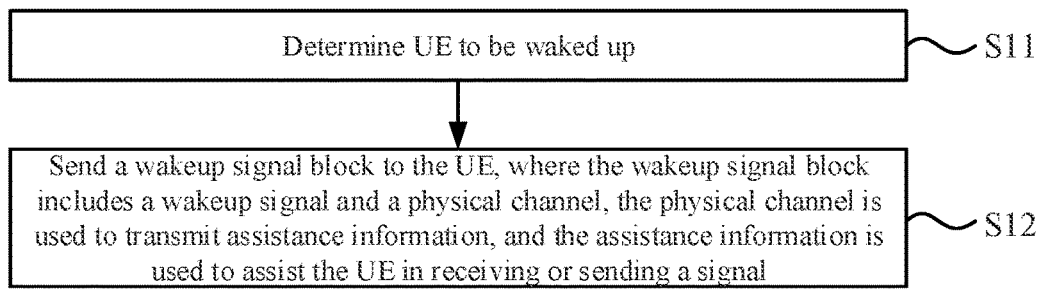
FIG. 1 is a flowchart of a wakeup method according to an example of the present disclosure.

FIG. 1 is a flowchart of a wakeup method according to an example of the present disclosure. The wakeup method in this example may be applied to a base station. The base station may communicate with user equipment (UE), for example, based on New Radio (NR) or based on Long Term Evolution (LTE). The UE may be a mobile phone, a tablet computer, a wearable device and so on.

As shown in FIG. 1, the wakeup method may include the following steps.

At step S11, UE to be waked up is determined:

At step S12, a wakeup signal block is sent to the UE, where the wakeup signal block includes a wakeup signal and a physical channel, the physical channel is used to transmit assistance information, and the assistance information is used to assist the UE in receiving or sending a signal.

In an example, the UE to be waked up may be UE in a connected state or in an idle state. The wakeup signal may have different wakeup effects on the UE in a different state.

For example, the wakeup signal may be used to indicate a timing when UE in an idle state receives a paging signaling. Thus, the UE may monitor what a base station broadcasts after the timing has been determined, for example, at the closest timing for receiving a paging signaling after receiving of the wakeup signal. In such way, a paging signaling may be received through monitoring only once. The wakeup signal may be in the form of a sequence, and it costs less power consumption for the UE to monitor and parse the sequence rather than the paging signaling. As a result, compared to the case of monitoring and parsing the paging signaling to receive the paging signaling, the UE may determine the timing for receiving the paging signaling by monitoring and parsing the wakeup signal and further receive the paging signaling at the determined timing, which reduces the power consumption of the UE.

For example, the wakeup signal may indicate an aggregation level for the UE in a connected state to demodulate information transmitted over a physical downlink control channel (PDCCH). Then, after determining the aggregation level, the UE can demodulate the information transmitted over the PDCCH according to the determined aggregation level. In this way, it may be avoided that the UE demodulates the information transmitted over the PDCCH several times with several aggregation levels due to not knowing a specific aggregation level, thereby reducing the power consumption of the UE.

Further, in this example, the wakeup signal block may include a physical channel as well as the wakeup signal. The physical channel may also be referred to as a wakeup physical channel. Assistance information may be transmitted over the physical channel. The assistance information may be used to assist the UE in receiving or sending a signal, for example, assist the UE in determining beams corresponding to receiving and sending a signal respectively, or assist the UE in demodulating information transmitted over another downlink channel. In this way, the wakeup signal block can carry the wakeup signal to wake up the UE and at the same time carry assistance information over the physical channel, so that more information can be sent to the UE when a wakeup signal is sent to the UE. Thus, more service requirements can be satisfied.

Optionally, if the UE is in a connected state, the assistance information includes assistance demodulation information, where the assistance demodulation information is used to demodulate information transmitted over the physical downlink control channel.

In an example, the assistance information may include the assistance demodulation information. Because information transmitted from a base station to the UE over the physical downlink control channel has been modulated, in order to obtain the information transmitted over the physical downlink control channel, the UE needs to demodulate the information modulated in the physical downlink control channel. By transmitting the assistance demodulation information over the physical channel in the wakeup signal block, the UE may receive the assistance demodulation information for demodulation upon receiving the wakeup signal. In this way, the base station may subsequently send other information to the UE at the timing originally scheduled for sending the demodulation information to the UE, thereby facilitating satisfying more service requirements.

Optionally, the assistance information includes assistance indication information, where the assistance indication information is used to indicate beams corresponding to signal receiving and signal sending of the UE respectively.

In an example, the assistance information may include the assistance indication information. The assistance indication information may indicate to the UE to receive a signal over one or more beams or send a signal over one or more beams. As a result, it can be guaranteed that the UE can receive a signal over a specified beam and send a signal over a specified beam according to the configuration of the base station, thereby facilitating satisfying more service requirements.

Optionally, if the UE is in a connected state, the assistance indication information includes index information of a synchronization signal block (SSB) (also referred to as SSB index) and/or a channel state information reference signal (CSI-RS).

Optionally, if the UE is in an idle state, the assistance indication information includes index information of a synchronization signal block.

In an example, there is a correspondence between the SSB index and the beam, and a correspondence between the CRI-RS and the beam.

Generally, since UE in an idle state has not yet established a communication connection with the base station, the assistance indication information for indicating beams which is possibly received by the UE can only include the SSB index. Thus, the assistance indication information sent to UE in an idle state may include the SSB index.

Since UE in a connected state has established a communication connection with the base station, the assistance indication information for indicating beams which is possibly received by the UE may be the SSB index or the CSI-RS. Therefore, the assistance indication information sent to UE in a connected state may include the SSB index and/or the CSI-RS. Whether the assistance indication information includes the SSB index or the CSI-RS or both the SSB index and the CSI-RS may be depending on actual configuration.

Optionally, the assistance information includes assistance grouping information, where the UE uses the assistance grouping information to determine whether a UE group to which the UE belongs corresponds to a UE group indicated by the assistance grouping information.

In an example, the assistance information may include the assistance grouping information which may indicate one or more user groups. After receiving the assistance grouping information, the UE may determine whether a UE group to which the UE belongs corresponds to a UE group indicated by the assistance grouping information. Here, in case that the assistance grouping information indicates one user group, the "correspond" refers to that the UE group to which the UE belongs is the same as the UE group indicated by the assistance grouping information; and in case that the assistance grouping information indicates several user groups, the "correspond" refers to that the UE group to which the UE belongs is included in the UE group indicated by the assistance grouping information.

If the UE group to which the UE belongs corresponds to the UE group indicated by the assistance grouping information, the UE may perform a specific action according to a pre-agreement with the base station. For example, UE in an idle state may start monitoring a paging signaling, and UE in a connected state may start receiving information transmitted over a physical downlink control channel. If the UE group to which the UE belongs does not correspond to the UE group indicated by the assistance grouping information, the UE remains in a current state, for example, UE in an idle state may be kept in a sleeping state.

Therefore, when a wakeup signal is sent to the UE, the assistance grouping information may be sent to the UE, thereby facilitating satisfying more service requirements.

Optionally, the wakeup signal includes the assistance grouping information, where the UE uses the assistance grouping information to determine whether a UE group to which the UE belongs corresponds to a UE group indicated by the assistance grouping information.

Different from transmission of the assistance grouping information over the physical channel in the above example, the assistance grouping information may be carried in the wakeup signal in the example. Whether the assistance grouping information is transmitted over the physical channel or carried in the wakeup signal may be configured according to requirements.

In addition, the assistance grouping information may be not only transmitted over the physical channel but also carried in the wakeup signal. In this case, only when the UE group to which the UE belongs corresponds to the UE group indicated by the assistance grouping information transmitted over the physical channel and also corresponds to the UE group indicated by the assistance grouping information carried in the wakeup signal can a specific action be performed based on a pre-agreement with the base station. As a result, it is avoided that the UE is incorrectly triggered to perform a specific action due to an error of the assistance grouping information transmitted over the physical channel or the assistance grouping information carried in the wakeup signal.

Optionally, the wakeup signal is an orthogonal pseudo-random sequence.

In an example, the base station may preset a plurality of pseudo-random sequences, for example, 16 pseudo-random sequences or 64 pseudo-random sequences or the like. The pseudo-random sequences are mutually orthogonal. For example, taking 16 pseudo-random sequences as an example, the UEs may be divided into 16 UE groups and those UEs belonging to the same UE group are assigned the same pseudo-random sequence. As a result, after receiving a wakeup signal block, a particular UE may determine whether the wakeup signal is associated with the pseudo-random sequence corresponding to the UE group to which the UE belongs. If associated, it is determined that the UE group to which the UE belongs corresponds to the UE group indicated by the assistance grouping information carried in the wakeup signal.

Optionally, the wakeup signal and the physical channel are frequency-division-multiplexed.

Figure 2A:
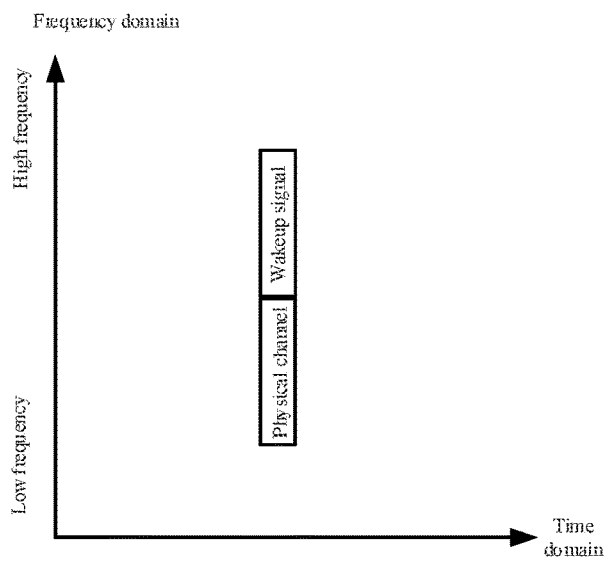
FIG. 2A is a schematic diagram of relationship of a wakeup signal and a physical channel according to an example of the present disclosure.
Figure 2B:
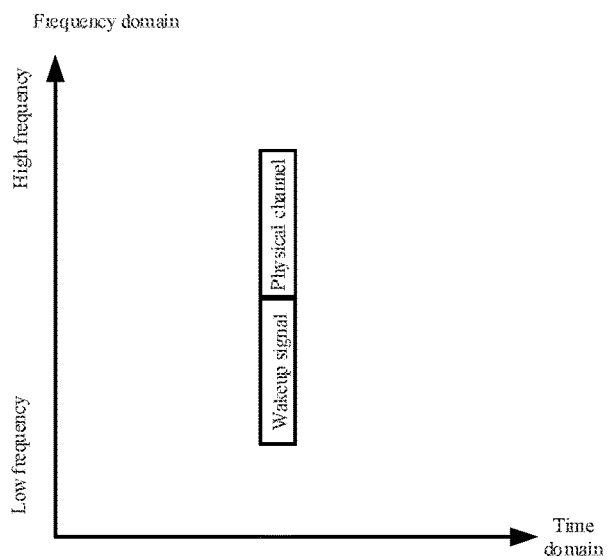
FIG. 2B is a schematic diagram of another relationship of a wakeup signal and a physical channel according to an example of the present disclosure.

FIG. 2A is a schematic diagram of relationship of a wakeup signal and a physical channel according to an example of the present disclosure. FIG. 2B is a schematic diagram of another relationship of a wakeup signal and a physical channel according to an example of the present disclosure.

In an example, the wakeup signal and the physical channel in the wakeup signal block may be frequency-division-multiplexed, that is, the wakeup signal and the physical channel correspond to a same symbol in time domain, and correspond to different frequency bands in frequency domain. For example, as shown in FIG. 2A, the wakeup signal may be in a high frequency band and the physical channel may be in a low frequency band; as shown in FIG. 2B, the physical channel may be in a high frequency band and the wakeup signal may be in a low frequency band.

Optionally, the wakeup signal and the physical channel may be time-division-multiplexed.

Figure 3A:
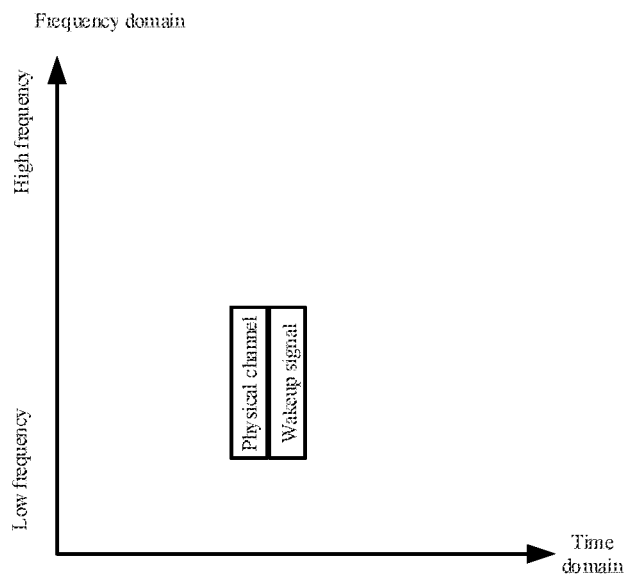
FIG. 3A is a schematic diagram of yet another relationship of a wakeup signal and a physical channel according to an example of the present disclosure.
Figure 3B:
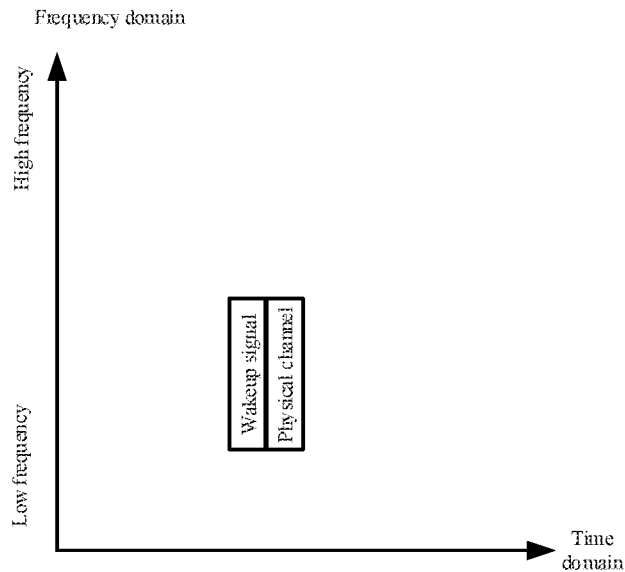
FIG. 3B is a schematic diagram of still another relationship of a wakeup signal and a physical channel according to an example of the present disclosure.

FIG. 3A is a schematic diagram of another relationship of a wakeup signal and a physical channel according to an example of the present disclosure. FIG. 3B is a schematic diagram of another relationship of a wakeup signal and a physical channel according to an example of the present disclosure.

In an example, the wakeup signal and the physical channel in the wakeup signal block may be time-division-multiplexed, that is, the wakeup signal and the physical channel correspond to the same frequency band in frequency domain, and correspond to different symbols in time domain. As shown in FIG. 3A, the wakeup signal may correspond to a latter symbol and the physical channel may correspond to a former symbol; as shown in FIG. 3B, the wakeup signal may correspond to a former symbol and the physical channel may correspond to a latter symbol.

Optionally, the information transmitted over the physical channel is scrambled by the wakeup signal.

Figure 4:
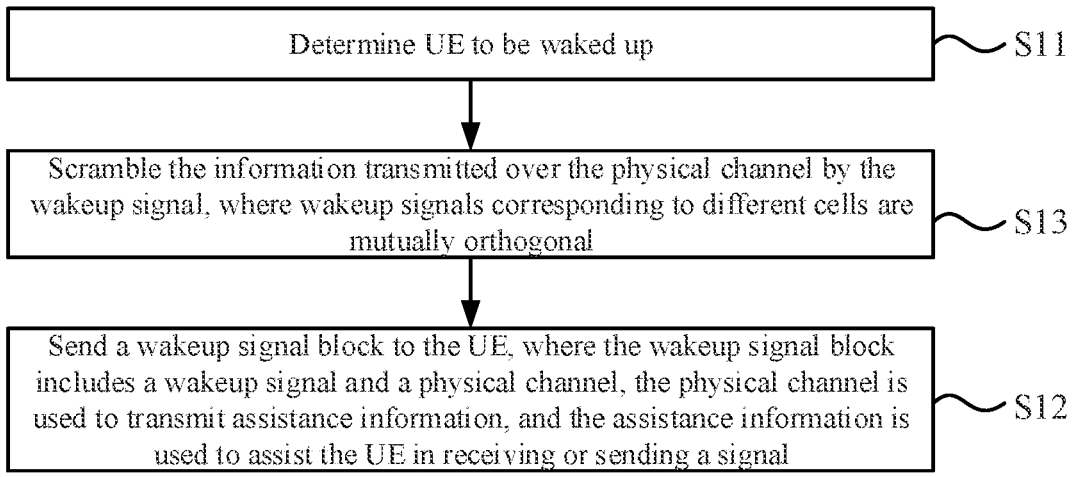
FIG. 4 is a flowchart of another wakeup method according to an example of the present disclosure.

FIG. 4 is a flowchart of another wakeup method according to an example of the present disclosure. As shown in FIG. 4, on the basis of the example of FIG. 1, the wakeup method further includes the following steps.

At step S13, before the wakeup signal block is sent to the UE, the information transmitted over the physical channel is scrambled by the wakeup signal, where wakeup signals corresponding to different cells are mutually orthogonal.

In an example, before sending the wakeup signal block to the UE, the base station may scramble the information transmitted over the physical channel. The information transmitted over the physical channel may be scrambled by the wakeup signal. The wakeup signals corresponding to different cells are mutually orthogonal (for example, different wakeup signals may be sent for different cells, and different wakeup signals are mutually orthogonal), where the wakeup signal may be a pseudo-random sequence. In this case, when the UE is covered by adjacent cells, for example, two adjacent cells A and B, even if the UE receives a wakeup signal block A and a wakeup signal block B from the two cells at the same time, because a wakeup signal A and a wakeup signal B in the two wakeup signal blocks A and B are mutually orthogonal, the information transmitted over a physical channel A in the wakeup signal block A may be descrambled by the wakeup signal A, and the information transmitted over a physical channel B in the wakeup signal block B may be descrambled by the wakeup signal B. In this way, it is guaranteed that signals transmitted over the physical channels A and B are obtained.

Figure 5:
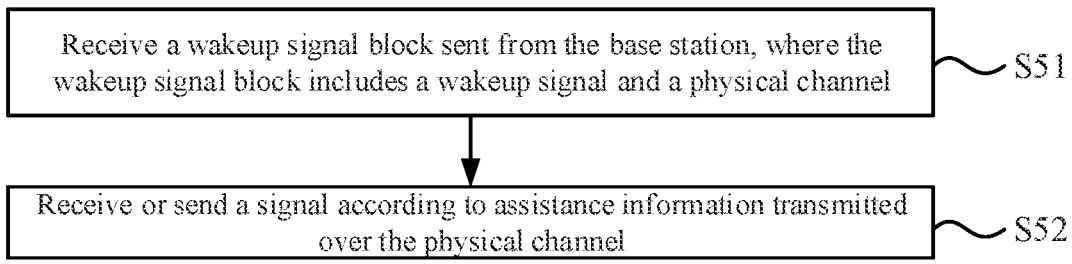
FIG. 5 is a flowchart of another wakeup method according to an example of the present disclosure.

FIG. 5 is a flowchart of another wakeup method according to an example of the present disclosure. The wakeup method in this example may be applied to UE. The UE may communicate with a base station, for example, based on NR or LTE. The UE may be an electronic device such as a mobile phone, a tablet computer, and a wearable device.

As shown in FIG. 5, the wakeup method may include the following steps.

At step S51, a wakeup signal block sent from the base station is received, where the wakeup signal block includes a wakeup signal and a physical channel.

At step S52, a signal is received or sent according to assistance information transmitted over the physical channel.

Figure 6:
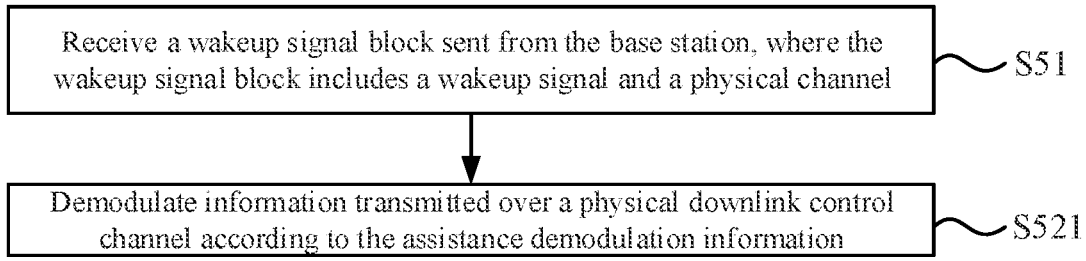
FIG. 6 is a flowchart of another wakeup method according to an example of the present disclosure.

FIG. 6 is a flowchart of another wakeup method according to an example of the present disclosure. As shown in FIG. 6, on the basis of the example of FIG. 5, if the UE is in a connected state, the assistance information includes assistance demodulation information. Receiving or sending a signal according to the assistance information transmitted over the physical channel includes the following step.

At step S521, information transmitted over a physical downlink control channel is demodulated according to the assistance demodulation information.

Figure 7:
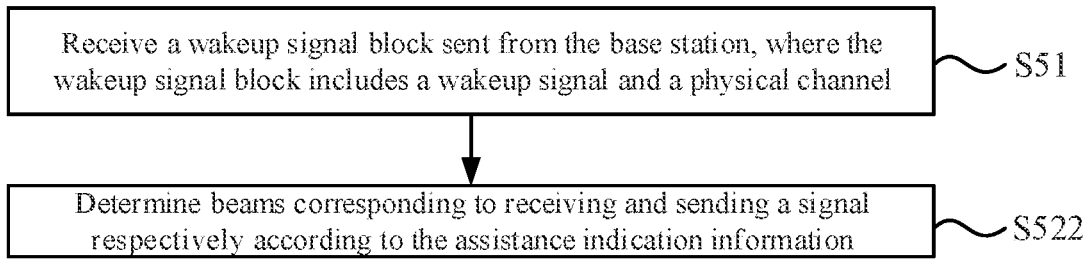
FIG. 7 is a flowchart of another wakeup method according to an example of the present disclosure.

FIG. 7 is a flowchart of another wakeup method according to an example of the present disclosure. As shown in FIG. 7, on the basis of the example of FIG. 5, the assistance information includes assistance indication information. Receiving or sending a signal according to the assistance information transmitted over the physical channel includes the following step.

At step S522, beams corresponding to receiving and sending a signal respectively are determined according to the assistance indication information.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Figure 8:
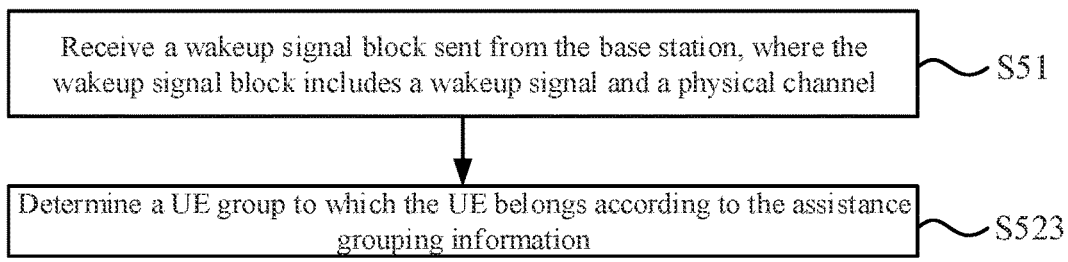
FIG. 8 is a flowchart of another wakeup method according to an example of the present disclosure.

FIG. 8 is a flowchart of another wakeup method according to an example of the present disclosure. As shown in FIG. 8, on the basis of example of FIG. 5, the assistance information includes assistance grouping information. Receiving or sending a signal according to the assistance information transmitted over the physical channel includes the following step.

At step S523, a UE group to which the UE belongs is determined according to the assistance grouping information.

Optionally, the wakeup signal includes the assistance grouping information. The UE uses the assistance grouping information to determine whether the UE group to which the UE belongs corresponds to a UE group indicated by the assistance grouping information.

Optionally, the wakeup signal is an orthogonal pseudo-random sequence.

Optionally, the wakeup signal and the physical channel are frequency-division-multiplexed.

Optionally, the wakeup signal and the physical channel are time-division-multiplexed.

Figure 9:
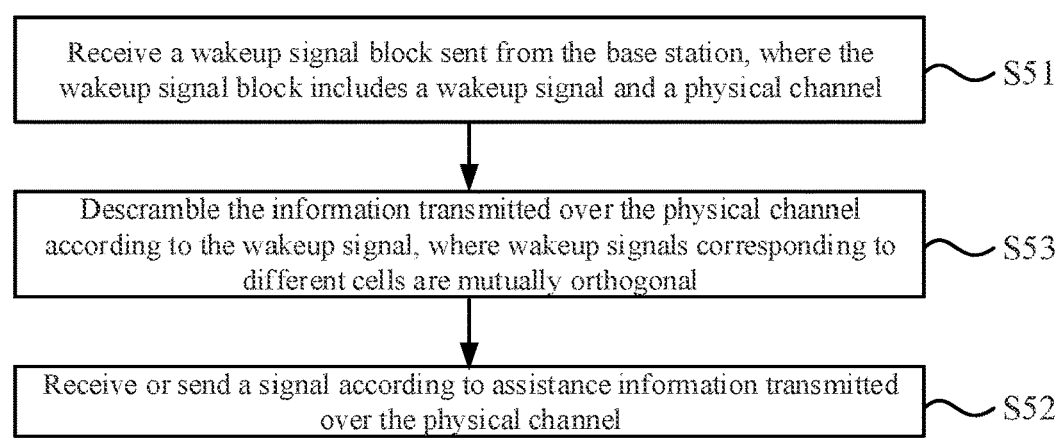
FIG. 9 is a flowchart of another wakeup method according to an example of the present disclosure.

FIG. 9 is a flowchart of another wakeup method according to an example of the present disclosure. As shown in FIG. 9, on the basis of the example of FIG. 5, the wakeup method further includes the following step.

At step S53, before the signal is received or sent according to the assistance information transmitted over the physical channel, the information transmitted over the physical channel is descrambled by the wakeup signal, where wakeup signals corresponding to different cells are mutually orthogonal.

Figure 10:
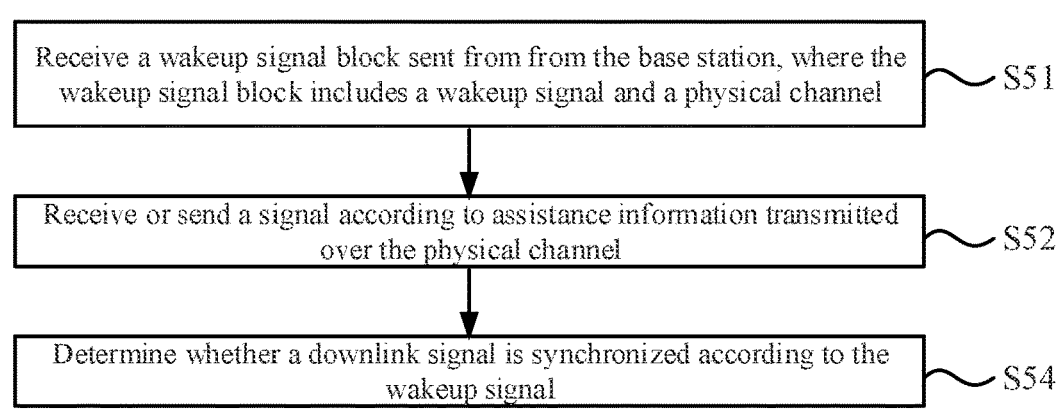
FIG. 10 is a flowchart of another wakeup method according to an example of the present disclosure.

FIG. 10 is a flowchart of another wakeup method according to an example of the present disclosure. As shown in FIG. 10, on the basis of the example of FIG. 5, the wakeup method further includes the following step.

At step S54, whether a downlink signal is synchronized is determined according to the wakeup signal.

In an example, after receiving a wakeup signal block, the UE may determine whether signal receiving is synchronized according to the wakeup signal in the wakeup signal block. For example, a timing t0 preconfigured by the base station for allowing a wakeup signal to be received may be determined; signal strength may be obtained by performing correlation for wakeup signals received at several timings; and a degree representing a downlink signal has not been synchronized, that is, a difference between a timing when the UE actually receives a signal and a timing expected to receive the signal, may be determined according to a difference between a timing t1 corresponding to a maximum value of the signal strength and the timing t0.

If t1 is before t0, it indicates that the signal receiving is advanced, if t1 is after to, it indicates that the signal receiving is delayed, and if t1 is equal to t0, it indicates that the downlink signal is synchronized. Further, in a case that the downlink signal is determined to be asynchronous, the UE may adjust a timing for receiving a signal according to a difference between t1 and t0 to ensure the downlink signal is synchronized.

Corresponding to the wakeup method of the above examples, the present disclosure further provides an example of a wakeup apparatus.

Figure 11:
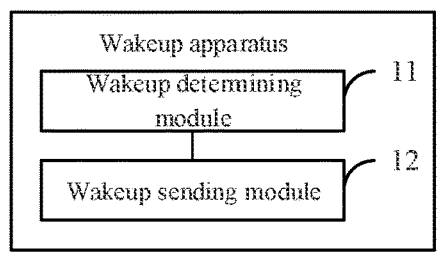
FIG. 11 is a schematic block diagram of a wakeup apparatus according to an example of the present disclosure.

FIG. 11 is a schematic block diagram of a wakeup apparatus according to an example of the present disclosure. The wakeup apparatus in this example may be applied to a base station. The base station may communicate with UE, for example, based on NR or LTE. The UE may be an electronic device such as a mobile phone, a tablet computer and a wearable device.

As shown in FIG. 11, the wakeup apparatus may include:
a wakeup determining module 11, configured to determine UE to be waked up; and
a wakeup sending module 12, configured to send a wakeup signal block to the UE, where the wakeup signal block includes a wakeup signal and a physical channel, the physical channel is used to transmit assistance information, and the assistance information is used to assist the UE in receiving or sending a signal.

Optionally, if the UE is in a connected state, the assistance information includes assistance demodulation information, where the assistance demodulation information is used to demodulate information transmitted over a physical downlink control channel.

Optionally, the assistance information includes assistance indication information, where the assistance indication information is used to indicate beams corresponding to signal receiving and signal sending of the UE respectively.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Optionally, the assistance information includes assistance grouping information, where the UE uses the assistance grouping information to determine whether a device group to which the UE belongs corresponds to a UE group indicated by the assistance grouping information.

Optionally, the wakeup signal includes the assistance grouping information, where the UE uses the assistance grouping information to determine whether a device group to which the UE belongs corresponds to a UE group indicated by the assistance grouping information.

Optionally, the wakeup signal is an orthogonal pseudo-random sequence.

Optionally, the wakeup signal and the physical channel are frequency-division-multiplexed.

Optionally, the wakeup signal and the physical channel are time-division-multiplexed.

Figure 12:
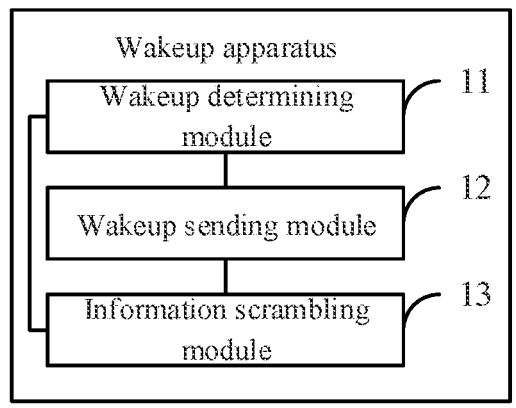
FIG. 12 is a schematic block diagram of another wakeup apparatus according to an example of the present disclosure.

FIG. 12 is a schematic block diagram of another wakeup apparatus according to an example of the present disclosure. As shown in FIG. 12, on the basis of the example of FIG. 11, the wakeup apparatus further includes:
an information scrambling module 13, configured to scramble, by the wakeup signal, information transmitted over the physical channel, where wakeup signals corresponding to different cells are mutually orthogonal.

Figure 13:
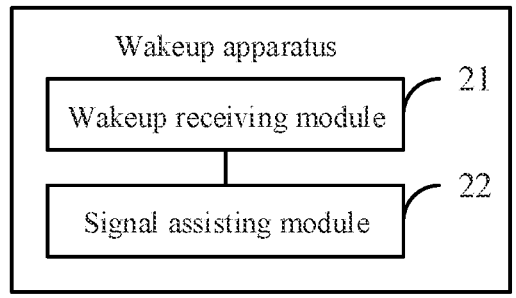
FIG. 13 is a schematic block diagram of another wakeup apparatus according to an example of the present disclosure.

FIG. 13 is a schematic block diagram of another wakeup apparatus according to an example of the present disclosure. The wakeup apparatus in this example may be applied to UE. The UE may communicate with a base station, for example, based on NR or LTE. The UE may be an electronic device such as a mobile phone, a tablet computer and a wearable device.

As shown in FIG. 13, the wakeup apparatus includes:
a wakeup receiving module 21, configured to receive a wakeup signal block sent from the base station, where the wakeup signal block includes a wakeup signal and a physical channel;
a signal assisting module 22, configured to receive or send a signal according to assistance information transmitted over the physical channel.

Optionally, if the UE is in a connected state, the signal assisting module is configured to demodulate information transmitted over a physical downlink control channel according to the assistance demodulation information.

Optionally, the assistance information includes assistance indication information, and the signal assisting module is configured to determine beams corresponding to receiving and sending a signal respectively according to the assistance indication information.

Optionally, if the UE is in a connected state, the assistance indication information includes index information of a synchronization signal block and/or a channel state information reference signal.

Optionally, if the UE is in an idle state, the assistance indication information includes index information of a synchronization signal block.

Optionally, the assistance information includes assistance grouping information, and the signal assisting module is configured to determine a UE group to which the UE belongs according to the assistance grouping information.

Optionally, the wakeup signal includes the assistance grouping information, where the UE uses the assistance grouping information to determine whether the UE group to which the UE belongs corresponds to a UE group indicated by the assistance grouping information.

Optionally, the wakeup signal is an orthogonal pseudo-random sequence.

Optionally, the wakeup signal and the physical channel are frequency-division-multiplexed.

Optionally, the wakeup signal and the physical channel are time-division-multiplexed.

Figure 14:
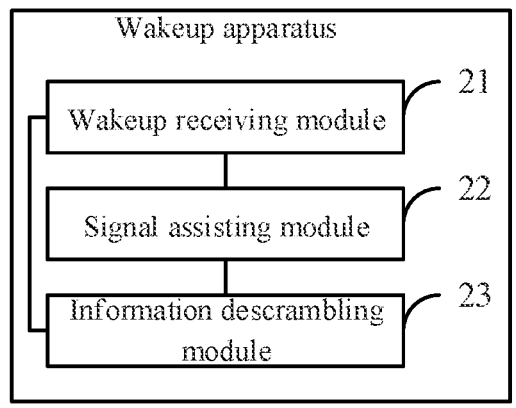
FIG. 14 is a schematic block diagram of another wakeup apparatus according to an example of the present disclosure.

FIG. 14 is a schematic block diagram of another wakeup apparatus according to an example of the present disclosure.

As shown in FIG. 14, on the basis of the example of FIG. 13, the wakeup apparatus further includes:

an information descrambling module 23, configured to descramble the information transmitted over the physical channel according to the wakeup signal, where wakeup signals corresponding to different cells are mutually orthogonal.

Figure 15:
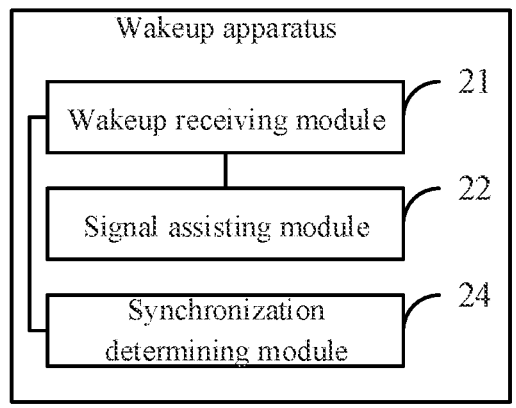
FIG. 15 is a schematic block diagram of another wakeup apparatus according to an example of the present disclosure.

FIG. 15 is a schematic block diagram of another wakeup apparatus according to an example of the present disclosure. As shown in FIG. 15, on the basis of the example of FIG. 13, the wakeup apparatus further includes:

a synchronization determining module 24, configured to determine whether a downlink signal is synchronized according to the wakeup signal.

The specific manner of performing operation by each module in the apparatus in the above examples is already detailed in the examples of the relevant method and will not be repeated herein.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

The example of the present disclosure further provides an electronic device, including:

a processor; and a memory storing instructions executable by the processor.

The processor is configured to perform the steps in the method according to any one above example.

An example of the present disclosure provides a computer readable storage medium storing computer programs thereon, where the programs are executed by the processor to perform the steps in the method according to any one above example.

Figure 16:
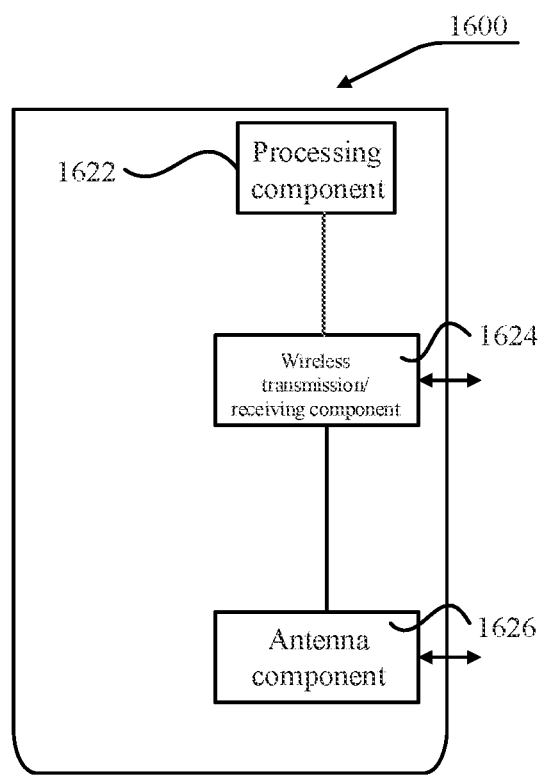
FIG. 16 is a structural schematic diagram of an apparatus for wakeup according to an example of the present disclosure.

FIG. 16 is a structural schematic diagram of an apparatus 1600 for wakeup according to an example of the present disclosure. The apparatus 1600 may be provided as a base station. As shown in FIG. 16, the apparatus 1600 includes a processing component 1622, a wireless transmission/receiving component 1624, an antenna component 1626, and a signal processing part specific to a wireless interface. The processing component 1622 may further include one or more processors. One processor in the processing component 1622 may be configured to perform the steps in the method according to any one above example.

Figure 17:
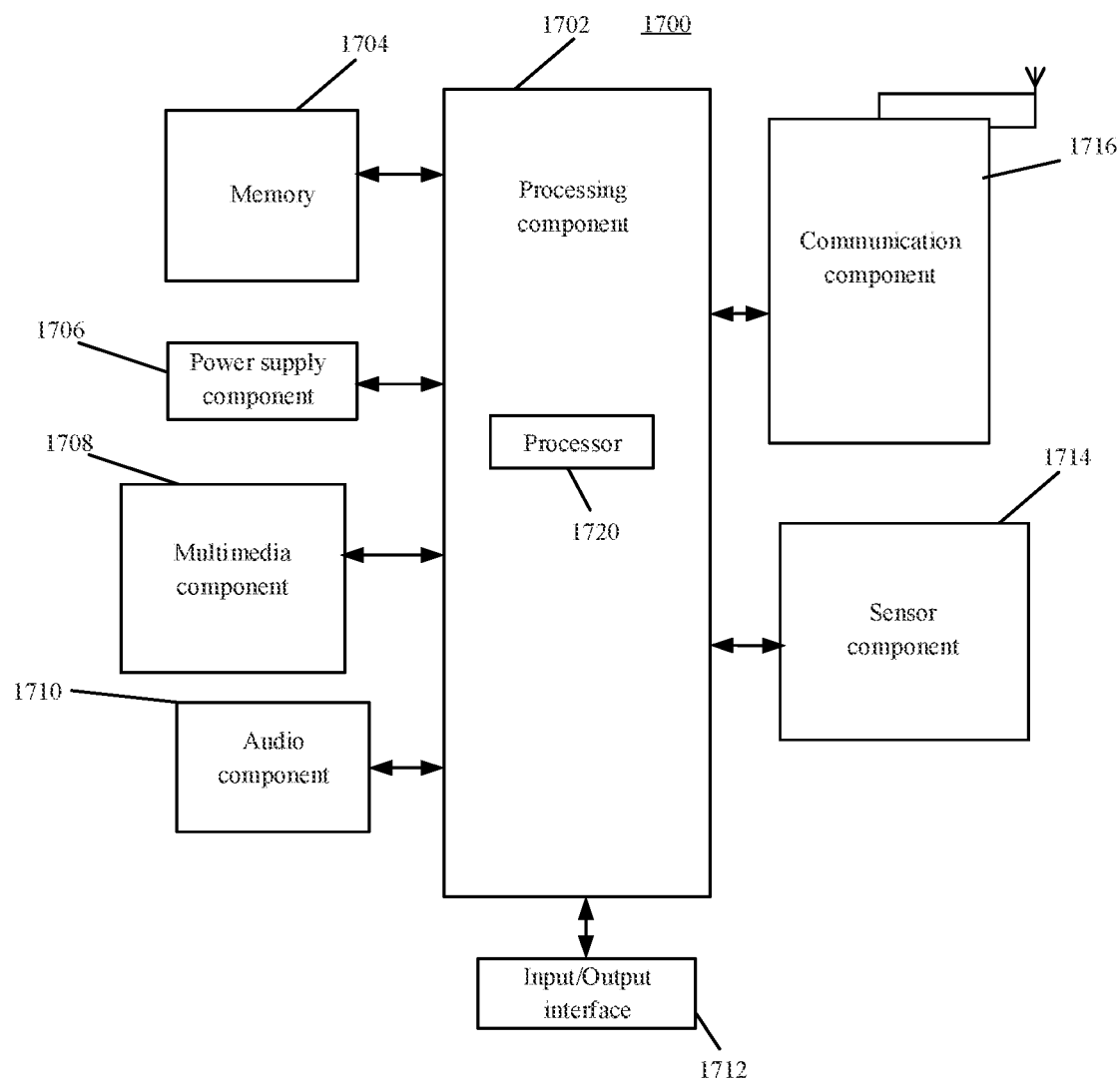
FIG. 17 is a structural schematic diagram of another apparatus for wakeup according to an example of the present disclosure.

FIG. 17 is a structural schematic diagram of another apparatus 1700 for wakeup according to an example of the present disclosure. For example, the apparatus 1700 may be a mobile phone, a computer, digital broadcast terminal, a message transceiver, a game console, a tablet device, a medical device, a fitness device and a personal digital assistant and so on.

As shown in FIG. 17, the apparatus 1700 may include one or more of a processing component 1702, a memory 1704, a power supply component 1706, a multimedia component 1708, an audio component 1710, an input/output interface 1712, a sensor component 1714 and a communication component 1716.

The processing component 1702 generally controls overall operations of the apparatus 1700, such as operations associated with display, phone calls, data communications, camera operations, and recording operations. The processing component 1702 may include one or more processors 1720 to execute instructions to complete all or part of the steps of the above methods. In addition, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any application or method operated on the apparatus 1700, contact data, phonebook data, messages, pictures, videos, and so on. The memory 1704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1706 supplies power for different components of the apparatus 1700. The power supply component 1706 may include a power supply management system, one or more power supplies, and other components associated with generating, managing and distributing power for the apparatus 1700.

The multimedia component 1708 includes a screen providing an output interface between the apparatus 1700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1708 may include a front camera and/or a rear camera. The front camera and/or rear camera may receive external multimedia data when the apparatus 1700 is in an operating mode, such as a photographing mode or a video mode. Each of the front camera and the rear camera may be a fixed optical lens system or have focal length and optical zooming capability.

The audio component 1710 is configured to output and/or input an audio signal. For example, the audio component 1710 includes a microphone (MIC). When the apparatus 1700 is in an operating mode, such as a call mode, a record mode and a voice recognition mode, the microphone is configured to receive an external audio signal. The received audio signal may be further stored in the memory 1704 or sent via the communication component 1716. In some examples, the audio component 1710 further includes a speaker for outputting an audio signal.

The I/O interface 1712 provides an interface between the processing component 1702 and a peripheral interface module. The above peripheral interface module may be a keyboard, a click wheel, buttons, or the like. These buttons may include but not limited to, a home button, a volume button, a start button and a lock button.

The sensor component 1714 includes one or more sensors to provide status assessments of various aspects for the apparatus 1700. For example, the sensor component 1714 may detect the on/off status of the apparatus 1700, and relative positioning of component, for example, the component is a display and a keypad of the apparatus 1700. The sensor component 1714 may also detect a change in position of the apparatus 1700 or a component of the apparatus 1700, a presence or absence of the contact between a user and the apparatus 1700, an orientation or an acceleration/deceleration of the apparatus 1700, and a change in temperature of the apparatus 1700. The sensor component 1714 may include a proximity sensor to detect the presence of a nearby object without any physical contact. The sensor component 1714 may further include an optical sensor, such as a Complementary Metal-Oxide-Semiconductor (CMOS) or Charged Coupled Device (CCD) image sensor which is used in imaging applications. In some examples, the sensor component 1714 may further include an acceleration sensor, a gyroscope sensor, a magnetic sensor, a pressure sensor, or a temperature sensor.

The communication component 1716 is configured to facilitate wired or wireless communication between the apparatus 1700 and other devices. The apparatus 1700 may access a wireless network based on a communication standard, such as Wi-Fi, 2G or 3G, or a combination thereof. In an example, the communication component 1716 receives a broadcast signal or broadcast related information from an external broadcast management system via a broadcast channel. In an example, the communication component 1716 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 1700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1704 including instructions. The above instructions may be executed by the processor 1720 of the apparatus 1700 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A wakeup method, performed by a base station, comprising:
   determining user equipment in an idle state to be waked up;
   sending a wakeup signal block to the user equipment, wherein the wakeup signal block comprises a wakeup signal and assistance information, the wakeup signal is configured to indicate a paging occasion when the user equipment receives a paging signaling, and the assistance information is transmitted over a physical channel and is configured to assist the user equipment in receiving or sending a signal; and
   sending the paging signaling at the paging occasion,
   wherein the wakeup signal comprises assistance grouping information for indicating at least one user equipment group, and the assistance information comprises assistance indication information for indicating a beam corresponding to receiving the paging signaling by the user equipment, wherein the wakeup signal block is configured for the user equipment to monitor the paging signaling, if a user equipment group to which the user equipment belongs corresponds to a user equipment group indicated by the assistance grouping information, and the wakeup signal block is configured for the user equipment to remain in the idle state and not to monitor the paging signaling, if the user equipment group to which the user equipment belongs does not correspond to the user equipment group indicated by the assistance grouping information; and
   wherein the assistance indication information and the wakeup signal are time-division-multiplexed, and the assistance indication information is later than the wakeup signal and earlier than the paging occasion in a time domain.

2. The method according to claim 1, wherein the assistance indication information comprises index information of a synchronization signal block.

3. The method according to claim 1, wherein the wakeup signal is an orthogonal pseudo-random sequence.

4. The method according to claim 1, further comprising:
before sending the wakeup signal block to the user equipment, scrambling information transmitted over the physical channel by the wakeup signal, wherein wakeup signals corresponding to different cells are mutually orthogonal.

5. A base station, comprising:
a processor; and
a memory storing instructions executable by the processor,
wherein the processor is configured to perform the method according to claim 1.

6. A wakeup method, performed by user equipment in an idle state, comprising:
receiving a wakeup signal block sent from a base station, wherein the wakeup signal block comprises a wakeup signal and assistance information, wherein the wakeup signal is configured to indicate a paging occasion when the user equipment receives a paging signaling, and comprises assistance grouping information for indicating at least one user equipment group, the assistance information is transmitted over a physical channel and is configured to assist the user equipment in receiving or sending a signal, and the assistance information comprises assistance indication information for indicating a beam corresponding to receiving the paging signaling by the user equipment;
monitoring the paging signaling, in response to a user equipment group to which the user equipment belongs corresponding to a user equipment group indicated by the assistance grouping information; and
remaining in the idle state and not monitoring the paging signaling, in response to the user equipment group to which the user equipment belongs not corresponding to the user equipment group indicated by the assistance grouping information,
wherein the assistance indication information and the wakeup signal are time-division-multiplexed, and the assistance indication information is later than the wakeup signal and earlier than the paging occasion in a time domain.

7. The method according to claim 6, wherein the assistance indication information comprises index information of a synchronization signal block.

8. The method according to claim 6, wherein the wakeup signal is an orthogonal pseudo-random sequence.

9. User equipment, comprising:
a processor; and
a memory storing instructions executable by the processor,
wherein the processor is configured to:
when the user equipment is in an idle state, receive a wakeup signal block sent from a base station, wherein the wakeup signal block comprises a wakeup signal and assistance information, wherein the wakeup signal is configured to indicate a paging occasion when the user equipment receives a paging signaling, and comprises assistance grouping information for indicating at least one user equipment group, the assistance information is transmitted over a physical channel and is configured to assist the user equipment in receiving or sending a signal, and the assistance information comprises assistance indication information for indicating a beam corresponding to receiving the paging signaling by the user equipment; and
monitor the paging signaling, in response to a user equipment group to which the user equipment belongs corresponding to a user equipment group indicated by the assistance grouping information; and
remain in the idle state and not monitor the paging signaling, in response to the user equipment group to which the user equipment belongs not corresponding to the user equipment group indicated by the assistance grouping information,
wherein the assistance indication information and the wakeup signal are time-division-multiplexed, and the assistance indication information is later than the wakeup signal and earlier than the paging occasion in a time domain.

10. The user equipment according to claim 9, wherein the assistance indication information comprises index information of a synchronization signal block.

11. The user equipment according to claim 9, wherein the wakeup signal is an orthogonal pseudo-random sequence.

* * * * *